(12) United States Patent
Sakamoto (10) Patent No.: US 7,689,338 B2
(45) Date of Patent: Mar. 30, 2010

(54) CONTROL APPARATUS FOR AUTOMATIC TRANSMISSION

(75) Inventor: Naoyuki Sakamoto, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 786 days.

(21) Appl. No.: 11/478,627

(22) Filed: Jul. 3, 2006

(65) Prior Publication Data

US 2007/0055430 A1    Mar. 8, 2007

(30) Foreign Application Priority Data

Sep. 7, 2005    (JP)    ............... 2005-259182

(51) Int. Cl.
F16H 61/02    (2006.01)
F16H 6/08    (2006.01)
G06F 19/00    (2006.01)

(52) U.S. Cl. .................. 701/51; 701/53; 701/55; 477/115

(58) Field of Classification Search .................. 701/51, 701/52, 55, 53; 477/107, 115, 125, 144, 477/148, 131, 156, 128, 166, 34
See application file for complete search history.

(56) References Cited

U.S. PATENT DOCUMENTS

| | | | | |
|---|---|---|---|---|
| 5,157,608 | A * | 10/1992 | Sankpal et al. | 701/58 |
| 5,655,993 | A * | 8/1997 | Fujimoto et al. | 477/116 |
| 5,879,266 | A * | 3/1999 | Sawamura et al. | 477/62 |
| 5,884,201 | A * | 3/1999 | Kawai | 701/22 |
| 6,368,249 | B1 * | 4/2002 | Hubbard | 477/121 |
| 2005/0245351 | A1 * | 11/2005 | Yamada et al. | 477/110 |
| 2006/0155448 | A1 * | 7/2006 | Shah | 701/50 |

FOREIGN PATENT DOCUMENTS

JP    2-80850    3/1990

* cited by examiner

Primary Examiner—Tan Q Nguyen
(74) Attorney, Agent, or Firm—Oblon, Spivak, McClelland, Maier & Neustadt, L.L.P.

(57) ABSTRACT

An ECU executes a program including the steps of when an upshift is requested, determining whether engine torque ET changing rate $\Delta ET >$ threshold value $\Delta ET$ (1) is established or not: incrementing a recovery timer TE when engine torque ET changing rate $\Delta ET < \Delta ET$ (2) is established during establishment of engine torque ET changing rate $\Delta ET >$ threshold value $\Delta ET$ (1); and initiating an upshift when recovery timer TE>threshold value TE (1).

6 Claims, 10 Drawing Sheets

|  | C1 | C2 | B1 | B2 | B3 | F |
|---|---|---|---|---|---|---|
| 1ST | ○ | × | × | ◎ | × | △ |
| 2ND | ○ | × | ○ | × | × | × |
| 3RD | ○ | × | × | × | ○ | × |
| 4TH | ○ | ○ | × | × | × | × |
| 5TH | × | ○ | × | × | ○ | × |
| 6TH | × | ○ | ○ | × | × | × |
| R | × | × | × | ○ | ○ | × |
| N | × | × | × | × | × | × |

○ ENGAGEMENT
× RELEASE
◎ ENGAGEMENT DURING ENGINE BRAKING
△ ENGAGEMENT ONLY DURING DRIVING

CONTROL APPARATUS FOR AUTOMATIC TRANSMISSION

This nonprovisional application is based on Japanese Patent Application No. 2005-259182 filed with the Japan Patent Office on Sep. 7, 2005, the entire contents of which are hereby incorporated by reference.

BACKGROUND OF THE INVENTION

1. Field of the Invention

The present invention relates to a control apparatus for an automatic transmission, particularly the technique of delaying initiation of gear change when the output shaft torque of the motive power source is changing.

2. Description of the Background Art

An automatic transmission that automatically effects gear changes based on the accelerator pedal position, the vehicle speed, and the like is conventionally known. In such an automatic transmission, the running state of the vehicle changes by variation in torque transmitted to the wheels by gear change. Such change in the running state caused by gear change may be felt as a jolt by the passenger, adversely affecting the drivability. It is therefore not always appropriate to effect gear change at the timing of the driver operating the accelerator pedal or at the timing of change in the vehicle speed. The approach of delaying the timing of effecting gear change with respect to the timing of determining gear change has been proposed.

Japanese Patent Laying-Open No. 02-080850 discloses a speed change control apparatus of delaying the engagement of the input clutch to conduct gear change when determination is made of a power-on downshift. The speed change control apparatus for an automatic transmission directed to a vehicle disclosed in the aforementioned publication is based on a planetary gear type transmission device having the input element switched by a first input clutch and a second input clutch. The speed change control apparatus includes a power-on downshift determination unit determining whether a power-on downshift is under way, i.e. downshifting to a lower gear implemented by the engagement of the first and second input clutches with a one way clutch from a higher gear implemented by engagement between the second input clutch and one reaction force element formation brake, and a delay unit delaying the engagement of the first input clutch when determination is made of a power-on downshift by the power-on downshift determination unit. Even if the first input clutch is released during engine driving at the gear implemented by the engagement of the first and second input clutches with the one way clutch, gear shifting can be implemented by engagement of the one way clutch. Further, even if the one way clutch is released during engine braking, gear shifting can be implemented by engagement of the first input clutch.

In accordance with the speed change control apparatus disclosed in the aforementioned publication, engagement of the first input clutch is delayed during a power-on downshift from the gear implemented by engagement between the second input clutch and one reaction force element formation brake to the next gear change implemented by engagement of the first and second input clutches with the one way clutch. Accordingly, the event of the first input clutch being engaged prior to engagement of the one way clutch can be obviated. During a power-on downshift mode in which the driver requests acceleration, the action of the engine brake on the vehicle caused by the one way clutch in a released state and the first input clutch attaining an engaged state can be suppressed. Thus, a power-on downshift can be effected without any great gear change shock.

The speed change control apparatus disclosed in the aforementioned publication merely effects delay for a period of time set with respect to the timing of gear change determination for gear shifting, and does not take into consideration the change in engine torque that may occur after determination of gear change. If gear change is effected corresponding to just a delay of the set time, there may be the case where the gear is shifted irrespective of the change in engine torque after gear change determination has been made. If gear change is effected ignoring the transitional change in engine torque subsequent to determination of gear change, the torque transmitted to the wheel (the output shaft torque of the automatic transmission) will change to cause an abrupt change in the vehicle acceleration. A gear change shock may occur by the abrupt change in acceleration. When gear change is effect under the state where the engine torque varies transitionally and the torque applied to the automatic transmission is unstable, it will be difficult to adjust the engagement pressure of the friction engagement elements of the automatic transmission so as to follow the change in torque. A gear change shock may occur in the case where the engagement pressure becomes higher than required with respect to the input torque (the case where the engagement pressure cannot be reduced in accordance with reduction in the input torque). The drivability will be degraded in all such cases.

SUMMARY OF THE INVENTION

An object of the present invention is to provide a control apparatus for an automatic transmission that can suppress degradation in drivability.

According to the present invention, a control apparatus for an automatic transmission controls the automatic transmission coupled to a motive power source. The control apparatus includes a sensing unit sensing an output shaft torque of the motive power source, and a control unit controlling the automatic transmission such that, when a changing rate of the output shaft torque satisfies a first predetermined condition, initiation of gear change is delayed until a second predetermined condition is satisfied.

When the changing rate of the output shaft torque satisfies the first predetermined condition in accordance with the first aspect of the present invention, initiation of gear change is delayed until the second predetermined condition is satisfied. For example, when the condition that the increase rate of the output shaft torque is larger than a first predetermined increase rate is satisfied, initiation of an upshift is delayed until the condition that the increase rate of the output shaft torque is smaller than a second predetermined increase rate is satisfied. Accordingly, reduction in the output shaft torque of the automatic transmission (the torque transmitted to the wheel) caused by upshifting during acceleration in which the output shaft torque of the motive power source is apt to increase can be suppressed. Therefore, occurrence of gear change shock caused by sudden reduction in the acceleration during an acceleration mode can be suppressed. Further, for example, when the condition that a reduction rate of the output shaft torque is larger than a first predetermined reduction rate is satisfied, initiation of an upshift is delayed until the condition that the reduction rate of the output shaft torque is smaller than a second predetermined reduction rate is satisfied. Accordingly, the event of an upshift being effected when the output shaft torque of the motive power source is apt to decrease and the output shaft torque of the motive power source is unstable can be suppressed. Therefore, a gear change shock that may occur due to effecting gear change under a state where the torque applied to the automatic transmission is unstable can be suppressed. As a result, a control apparatus for an automatic transmission that can suppress degradation in drivability can be provided.

Preferably, the control unit controls the automatic transmission such that, when the changing rate of the output shaft torque satisfies the first predetermined condition, initiation of an upshift is delayed until the second predetermined condition is satisfied.

For example, when the condition that the increase rate of the output shaft torque is larger than a first predetermined increase rate is satisfied in accordance with the invention of the present aspect, initiation of an upshift is delayed until the condition that the increase rate of the output shaft torque is smaller than the second predetermined increase rate is satisfied. Accordingly, reduction in the output shaft torque of the automatic transmission (the torque transmitted to the wheel) caused by upshifting during acceleration in which the output shaft torque of the motive power source is apt to increase can be suppressed. Therefore, occurrence of a gear change shock caused by a sudden reduction in acceleration during an acceleration mode can be suppressed. Further, when the condition that the reduction rate of the output shaft torque is larger than the first predetermined reduction rate is satisfied, initiation of an upshift is delayed until the condition that the reduction rate of the output shaft torque is smaller than the second predetermined reduction rate is satisfied. Accordingly, the event of an upshift being effected when the output shaft torque of the motive power source is apt to be reduced and is unstable can be suppressed. Therefore, a gear change shock that may occur due to gear change under a state where the torque applied to the automatic transmission is unstable can be suppressed. As a result, degradation in drivability can be suppressed.

More preferably, the first predetermined condition includes the condition that the increase rate of the output shaft torque is larger than a first predetermined increase rate. The second predetermined condition includes the condition that the increase rate of the output shaft torque is smaller than a second predetermined increase rate.

When the condition that the increase rate of the output shaft torque is larger than a first predetermined increase rate according to the invention of the present aspect is satisfied, initiation of an upshift is delayed until the condition that the increase rate of the output shaft torque is smaller than the second predetermined increase rate is satisfied. Accordingly, reduction in the output shaft torque of the automatic transmission (the torque transmitted to the wheel) due to upshifting during acceleration in which the output shaft torque of the motive power source is apt to increase can be suppressed. Therefore, occurrence of a gear change shock caused by a sudden reduction in acceleration during an acceleration mode can be suppressed. As a result, degradation in drivability can be suppressed.

More preferably, a downshift control unit controls the automatic transmission such that, when a downshift is requested prior to initiation of an upshift due to delay of an upshift, a downshift is effected by priority than an upshift.

When the output shaft torque of the motive power source is apt to increase in accordance with the invention of the present aspect, the output shaft torque of the automatic transmission (the torque transmitted to the wheel) can be further increased by downshifting to accelerate the vehicle. Therefore, a downshift is effected by priority than an upshift. Thus, the vehicle can be further accelerated. The vehicle can be accelerated as requested by the driver. As a result, degradation in drivability can be suppressed.

More preferably, the first predetermined condition includes the condition that the reduction rate of the output shaft torque is larger than a first predetermined reduction rate. The second predetermined condition includes the condition that the reduction rate of the output shaft torque is smaller than the second predetermined reduction rate.

When the condition that the reduction rate of the output shaft torque is larger than the first predetermined reduction rate is satisfied in accordance with the present aspect, initiation of an upshift is delayed until the condition that the reduction rate of the output shaft torque is smaller than the second predetermined reduction rate is satisfied. Therefore, the event of an upshift being effected when the output shaft torque of the motive power source is apt to be reduced and is unstable can be suppressed. Therefore, a gear change shock that may occur due to gear change under a state where the torque applied to the automatic transmission is unstable can be suppressed. As a result, degradation in drivability can be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described hereinafter with reference to the drawings. In the following, the same elements have the same reference characters allotted. Their designation and function are also identical. Therefore, detailed description thereof will not be repeated.

First Embodiment

Figure 1:
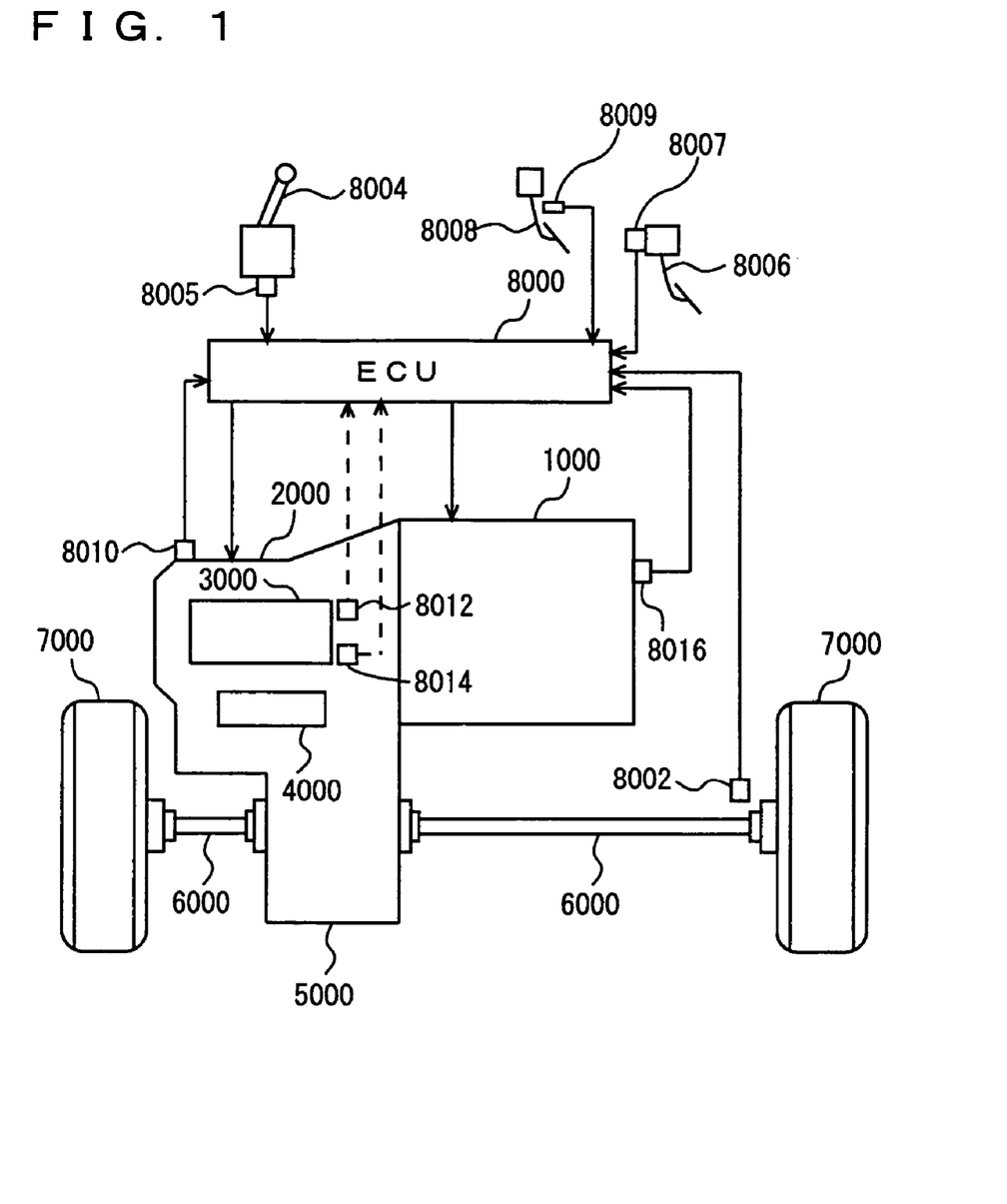
FIG. 1 is a schematic view of a power train under control of an ECU (Electronic Control Unit) qualified as a control apparatus according to a first embodiment of the present invention.

A vehicle incorporating a control apparatus according to a first embodiment of the present invention will be described with reference to FIG. 1. The vehicle is an FF (Front engine Front drive) vehicle. The vehicle incorporating the control apparatus for an automatic transmission according to the present embodiment is not limited to an FF vehicle.

The vehicle includes an engine 1000, a transmission 2000, a planetary gear unit 3000 constituting a portion of transmission 2000, an oil hydraulic circuit 4000 constituting a portion of transmission 2000, a differential gear 5000, a drive shaft 6000, a front wheel 7000, and an ECU (Electronic Control Unit) 8000.

Although the present embodiment will be described based on a transmission 2000 that effects gear change in a stepped manner by planetary gear unit 3000, transmission 2000 may be a CVT (Continuously Variable Transmission).

Engine 1000 is an internal combustion engine that burns a mixture consisting of fuel injected from an injector (not shown) and air, inside a combustion chamber of a cylinder. A piston in the cylinder is pushed down by the combustion, whereby a crankshaft is rotated. An external combustion engine may be employed instead of an internal combustion engine. Further, engine 1000 may be substituted with a rotating electric machine.

Transmission 2000 converts the revolution speed of the crankshaft to a desired revolution speed for speed change by implementing a desired gear. The output gear of transmission 2000 meshes with differential gear 5000.

A driveshaft 6000 is coupled to differential gear 5000 by spline-fitting. Motive power is transmitted to the left and right front wheel 7000 via driveshaft 6000.

A vehicle speed sensor 8002, a position switch 8005 of a shift lever 8004, an accelerator pedal position sensor 8007 of an accelerator pedal 8006, a stop lamp switch 8009 provided at brake pedal 8008, an oil temperature sensor 8010, an input shaft speed sensor 8012, an output shaft speed sensor 8014, and a coolant temperature sensor 8016 are connected to ECU 8000 via a harness and the like.

Vehicle speed sensor 8002 senses the vehicle speed from the revolution of drive shaft 6000, and transmits a signal representing the sensed result to ECU 8000. The position of shift lever 8004 is sensed by position switch 8005, and a signal representing the sensed result is transmitted to ECU 8000. A gear of transmission 2000 is automatically implemented corresponding to the position of shift lever 8004. Additionally, the driver may operate to select a manual shift mode in which the driver can select a gear arbitrarily.

Accelerator pedal position sensor 8007 detects the position of accelerator pedal 8006, and transmits a signal representing the detected result to ECU 8000. Stop lamp switch 8009 senses the ON/OFF state of brake pedal 8008, and transmits a signal representing the sensed result to ECU 8000. A stroke sensor sensing the stroke level of brake pedal 8008 may be provided instead of or in addition to stop lamp switch 8009.

Oil temperature sensor 8010 senses the temperature of the ATF (Automatic Transmission Fluid) of transmission 2000, and transmits a signal representing the sensed result to ECU 8000.

Input shaft speed sensor 8012 senses the input shaft revolution NI of transmission 2000, and transmits a signal representing the sensed result to ECU 8000. Output shaft speed sensor 8014 senses the output shaft revolution NO of transmission 2000, and transmits a signal representing the sensed result to ECU 8000. Coolant temperature sensor 8016 senses the temperature of the coolant of engine 1000, and transmits a signal representing the sensed result to ECU 8000.

ECU 8000 controls various devices such that the vehicle attains a desired running state based on signals transmitted from vehicle speed sensor 8002, position switch 8005, accelerator pedal position sensor 8007, stop lamp switch 8009, oil temperature sensor 8010, input shaft speed sensor 8012, output shaft speed sensor 8014, and the like, as well as the map and program stored in a ROM (Read Only Memory).

In the present embodiment, ECU 8000 determines the speed of transmission to be implemented according to a shift map produced based on the parameters of the output shaft revolution NO (vehicle speed), the accelerator pedal position, and the like.

Figure 2:
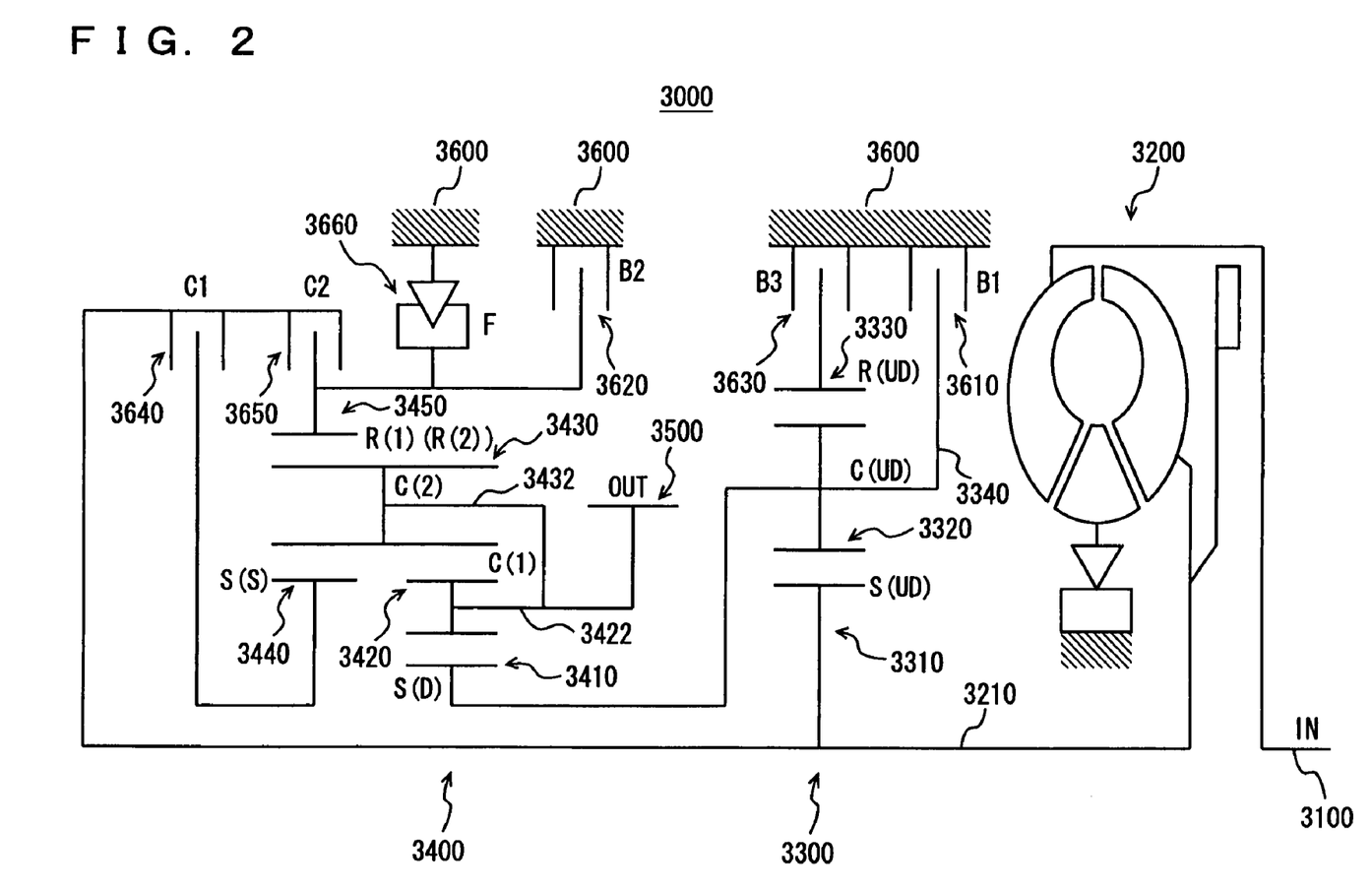
FIG. 2 is a skeletal view of a gear train in a transmission.

Planetary gear unit 3000 will be described with reference to FIG. 2. Planetary gear unit 3000 is connected to a torque converter 3200 having an input shaft 3100 coupled to the crankshaft. Planetary gear unit 3000 includes a first set of the planetary gear mechanism 3300, a second set of planetary gear mechanism 3400, an output gear 3500, B1, B2, and B3 brakes 3610, 3620 and 3630 fixed to a gear case 3600, C1 and C2 clutches 3640 and 3650, and a one way clutch F3660.

First set 3300 is a single pinion type planetary gear mechanism. First set 3300 includes a sun gear S (UD) 3310, a pinion gear 3320, a ring gear R (UD) 3330, and a carrier C (UD) 3340.

Sun gear S (UD) 3310 is coupled to output shaft 3210 of torque converter 3200, Pinion gear 3320 is rotatably supported on carrier C (UD) 3340. Pinion gear 3320 engages with sun gear S (UD) 3310 and ring gear R (UD) 3300.

Ring gear R (UD) 3330 is fixed to gear case 3600 by B3 brake 3630. Carrier C (UD) 3340 is fixed to gear case 3600 by B1 brake 3610.

Second set 3400 is a Ravigneaux type planetary gear mechanism. Second set 3400 includes a sun gear S (D) 3410, a short-pinion gear 3420, a carrier C (1) 3422, a long pinion gear 3430, a carrier C (2) 3432, a sun gear S (S) 3440, and a ring gear R (1) (R (2)) 3450.

Sun gear S (D) 3410 is coupled to carrier C (UD) 3340. Short-pinion gear 3420 is rotatably supported on carrier C (1) 3422. Short pinion gear 3420 engages with sun gear S (D) 3410 and long pinion gear 3430. Carrier C (1) 3422 is coupled with output gear 3500.

Long pinion gear 3430 is rotatably supported on carrier C (2) 3432. Long pinion gear 3430 engages with short pinion gear 3420, sun gear S (S) 3440, and ring gear R (1) (R (2)) 3450. Carrier C (2) 3432 is coupled with output gear 3500.

Sun gear S (S) 3440 is coupled to output shaft 3210 of torque converter 3200 via C1 clutch 3640. Ring gear R (1) (R (2)) 3450 is fixed to gear case 3600 by B2 brake 3620, and coupled to output shaft 3210 of torque converter 3200 by C2 clutch 3650. Ring gear R (1) (R (2)) 3450 is coupled to one way clutch F3660, and is disabled in rotation during the drive of first gear.

One way clutch F3660 is provided in parallel with B2 brake 3620. Specifically, one way clutch F3660 has the outer race fixed to gear case 3600, and the inner race coupled to ring gear R (1) (R (2)) 3450 via the rotation shaft.

Figure 3:
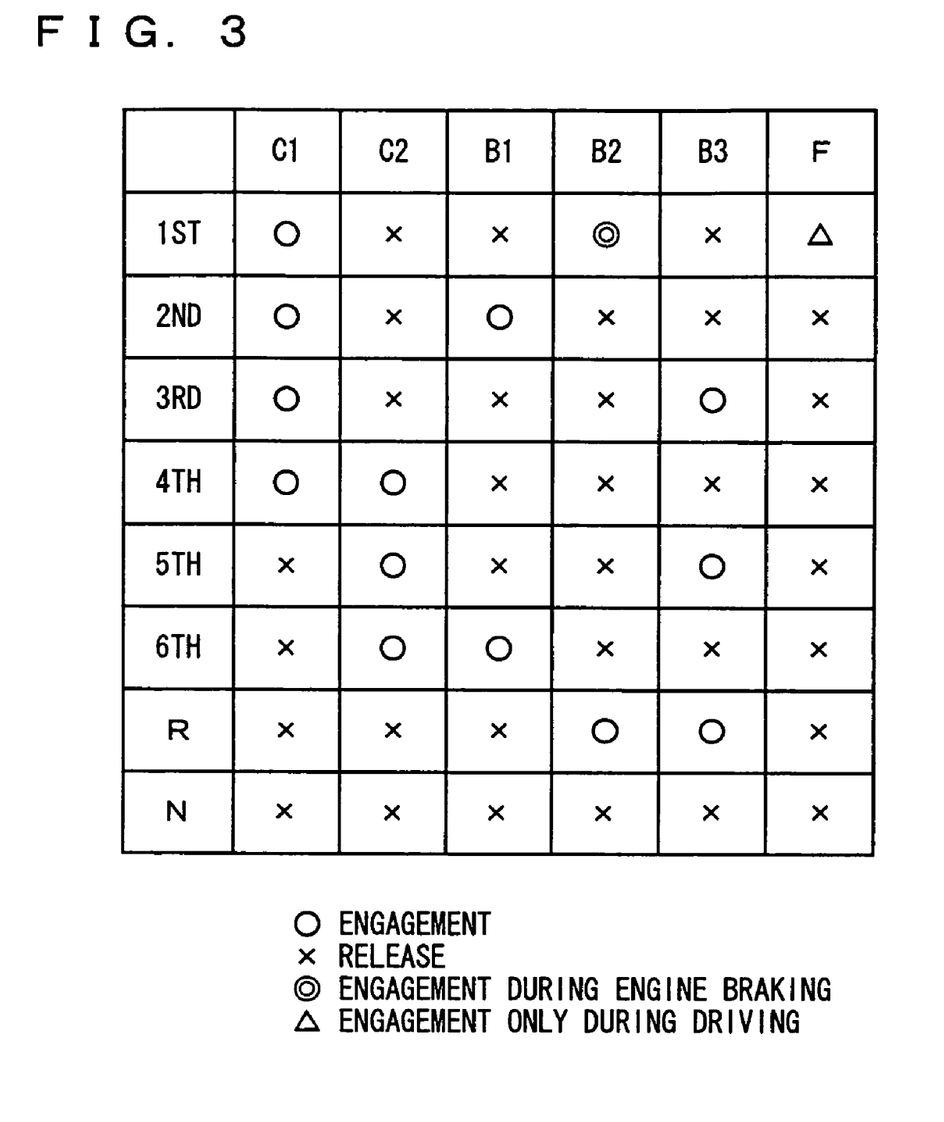
FIG. 3 represents an operation table of a transmission.

FIG. 3 is an operation table representing the operation state relation between respective clutches and brakes. By operating each brake and each clutch based on the combination shown in the operation table, the forward gears of first gear to sixth gear and the reverse gear are implemented.

Since one way clutch F3660 is provided in parallel with B2 brake 3620, it is not necessary to engage B2 brake 3620 in a driving state from the engine side (acceleration) during implementation of first gear (1ST), as indicated in the operation table.

During the drive of first gear, one way clutch F3660 restricts the rotation of ring gear R (1) (R (2)) 3450. When engine brake is effected, one way clutch F3660 does not restrict the rotation of ring gear R (1) (R (2)) 3450.

Specifically, during the drive of normal gear control, first gear is implemented by engagement of C1 clutch 3640 and one way clutch F3660. During engine braking in normal gear control, first gear is implemented by engagement of C1 clutch 3640 and B2 brake 3620.

Figure 4:
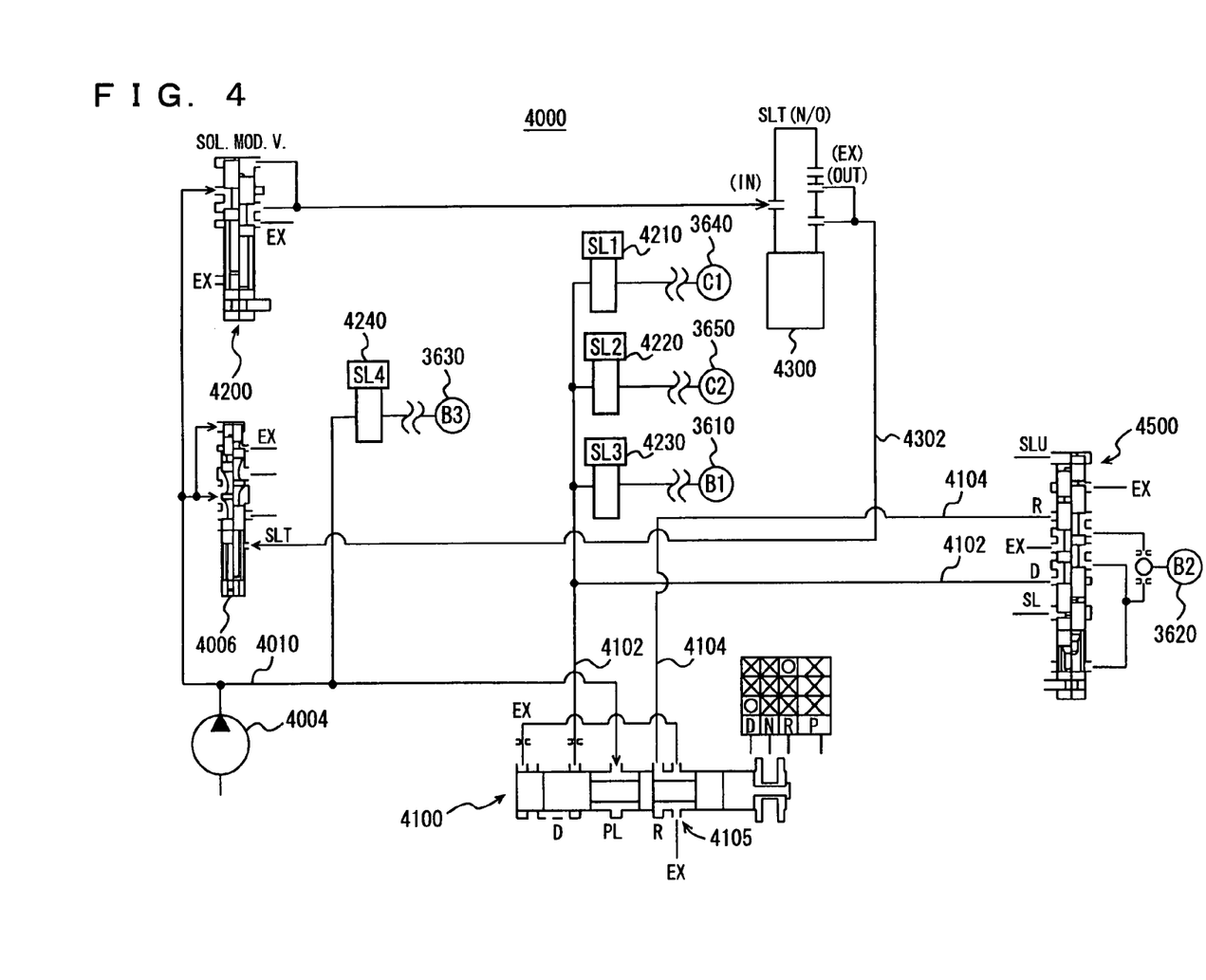
FIG. 4 shows a portion of an oil hydraulic circuit in the transmission.

Oil hydraulic circuit 4000 will be described hereinafter with reference to FIG. 4. FIG. 4 represents only the portion of oil hydraulic circuit 4000 related to the present invention. Oil hydraulic circuit 4000 includes an oil pump 4004, a primary regulator valve 4006, a manual valve 4100, a solenoid modulator valve 4200, an SL1 linear solenoid (hereinafter, indicated as SL (1)) 4210, an SL2 linear solenoid (hereinafter, indicated as SL (2)) 4220, an SL3 linear solenoid (hereinafter, indicated as SL (3)) 4230, an SL4 linear solenoid (hereinafter, indicated as SL (4)) 4240, an SLT linear solenoid (hereinafter, indicated as SLT) 4300, and a B2 control valve 4500.

Oil pump 4004 is coupled with the crankshaft of engine 1000. By rotation of the crankshaft, oil pump 4004 is driven to generate oil pressure. The oil pressure generated at oil pump 4004 is adjusted by primary regulator valve 4006, whereby line pressure is generated.

Primary regulator valve 4006 operates with the throttle pressure adjusted by SLT 4300 as the pilot pressure. The line pressure is supplied to manual valve 4100 via line pressure oil channel 4010. The line pressure is adjusted by SL (4) 4240 to be supplied to B3 brake 3630.

Manual valve 4100 includes a drain port 4105. The oil pressure of D range pressure oil channel 4102 and R range pressure oil channel 4104 is discharged from drain port 4105. When the spool of manual valve 4100 is at the D position, line pressure oil channel 4010 communicates with D range pressure oil channel 4102, whereby oil pressure is supplied to D range pressure oil channel 4102. At this stage, R range pressure oil channel 4104 communicate with drain port 4105, whereby the R range pressure of R range pressure oil channel 4104 is discharged from drain port 4105.

When the spool of manual valve 4100 is at the R position, line pressure oil channel 4010 communicates with R range pressure oil channel 4104, whereby oil pressure is supplied to R range pressure oil channel 4104. At this stage, D range pressure oil channel 4102 communicates with drain port 4105, whereby the D range pressure of D range pressure oil channel 4102 is discharged from drain port 4105.

When the spool of manual valve 4100 is at the N position, D range pressure oil channel 4102 and R range pressure oil channel 4104 both communicate with drain port 4105, whereby the D range pressure of D range pressure oil channel 4102 and the R range pressure of R range pressure oil channel 4104 are discharged from drain port 4105.

The oil pressure supplied to D range pressure oil channel 4102 is eventually supplied to B1 brake 3610, B2 brake 3620, C1 clutch 3640 and C2 clutch 3650.

The oil pressure supplied to R range pressure oil channel 4104 is eventually supplied to B2 brake 3620.

Solenoid modulator valve 4200 adjusts the line pressure at a constant level. The oil pressure adjusted by solenoid modulator valve 4200 (solenoid modulator pressure) is supplied to SLT 4300.

SL (1) 4210 adjusts the oil pressure supplied to C1 clutch 3640. SL (2) 4220 adjusts the oil pressure supplied to C2 clutch 3650. SL (3) 4230 adjusts the oil pressure supplied to B1 brake 3610.

SLT 4300 responds to a control signal from ECU 8000 based on the accelerator pedal position detected by accelerator pedal position sensor 8007 to adjust the solenoid modulator pressure and generate the throttle pressure. The throttle pressure is supplied to primary regulator valve 4006 via SLT oil channel 4302. The throttle pressure is used as the pilot pressure of primary regulator valve 4006.

SL (1) 4210, SL (2) 4220, SL (3) 4230 and SLT 4300 are controlled by a control signal transmitted from ECU 8000.

B2 control valve 4500 selectively supplies the oil pressure from one of D range pressure oil channel 4102 and R range pressure oil channel 4104 to B2 brake 3620. D range oil pressure 4102 and R range oil pressure 4104 are connected to B2 control valve 4500. B2 control valve 4500 is controlled by the oil pressure supplied from an SL solenoid valve (not shown) and an SLU solenoid valve (not shown) and the urge of the spring.

When the SL solenoid valve is OFF and SLU solenoid valve is ON, B2 control valve 4500 attains the left side state of FIG. 4. In this case, B2 brake 3620 is supplied with oil pressure having the D range pressure adjusted with the oil pressure supplied from the SLU solenoid valve as the pilot pressure.

When the SL solenoid valve is ON and the SLU solenoid valve is OFF, B2 control valve 4500 attains the right side state of FIG. 4. In this case, B2 brake 3620 is supplied with the R range pressure.

Figure 5:
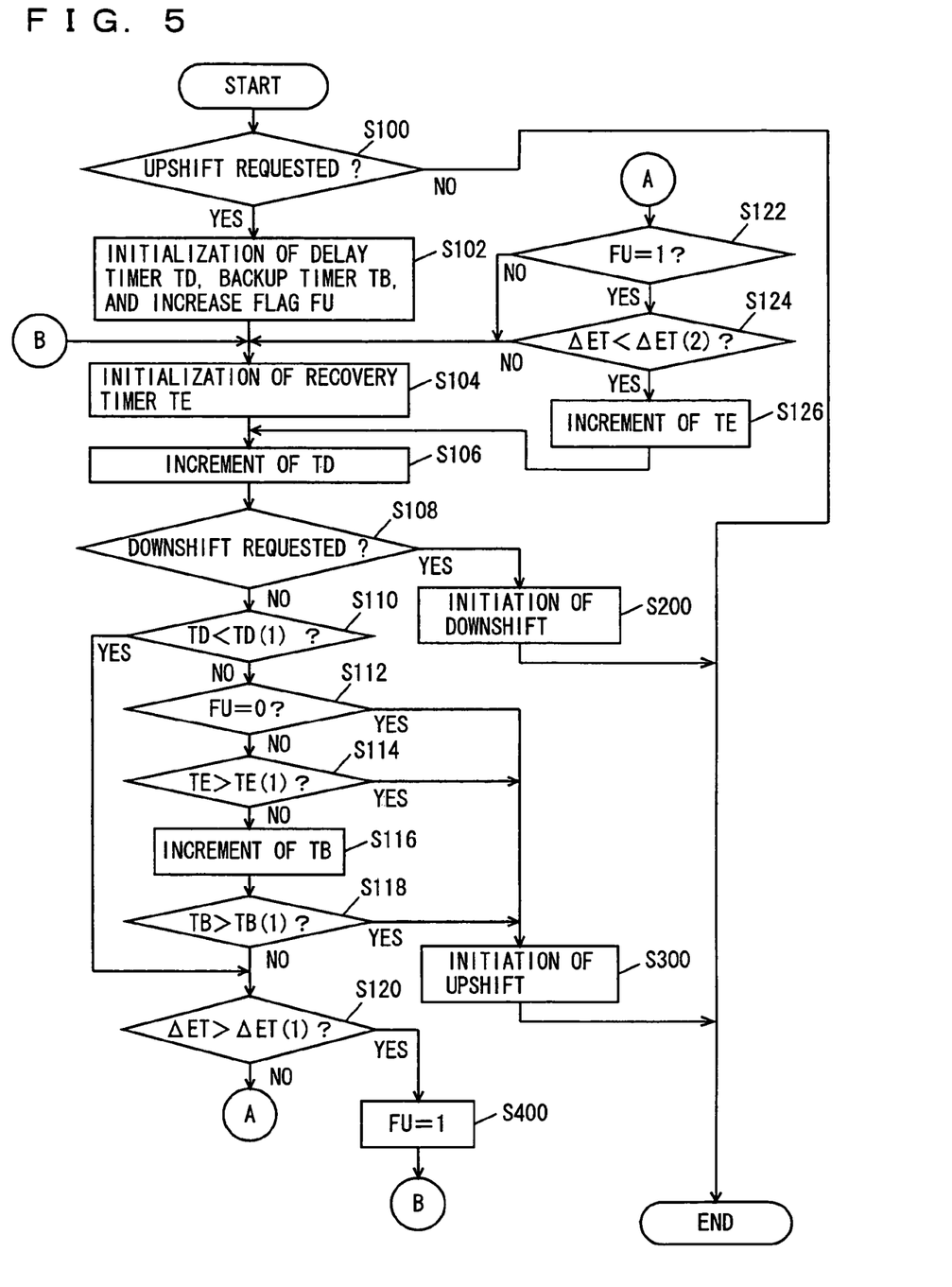
FIG. 5 is a flow chart of a control program executed by the ECU qualified as the control apparatus according to the first embodiment of the present invention.

The control program executed by ECU 8000 qualified as the control apparatus according to the present embodiment will be described hereinafter with reference to FIG. 5.

At step (hereinafter, step abbreviated as S) 100, ECU 8000 determines whether there is an upshift request. The presence of an upshift request is determined based on the shift map stored in the ROM and the operation towards shift lever 8004. When there is an upshift request (YES at S100), control proceeds to S102, otherwise (NO at S100), the process ends.

At S102, ECU 8000 initializes a delay timer TD, a backup timer TB, and an increase flag FU. Delay timer TD counts to delay initiation of upshifting when an upshift is requested. Backup timer TB counts to restrict the delay time of initiating upshifting. Increase flag FU is set to determine the changing tendency of the engine torque (output shaft torque of engine 1000) ET. By initialization, delay timer TD, backup timer TB, and increase flag FU are all set to "0".

At S104, ECU 8000 initializes a recovery timer TE. Recovery timer TE counts to determine whether upshifting is to be initiated or not. By initialization, recovery timer TE is set to "0".

At S106, ECU 8000 increments delay timer TD by "1". Specifically, "1" is added to the previous value of delay timer TD to provide the current value of delay timer TD.

At S108, ECU 8000 determines whether there is a downshift request. This determination is made based on the shift map stored in the ROM and an operation towards shift lever 8004. When there is a downshift request (YES at S108), control proceeds to S200, otherwise (NO at S108), control proceeds to S110.

At S110, ECU 8000 determines whether delay timer TD<threshold value TD (1) is established or not. When delay timer TD<threshold value TD (1) is established (YES at S110), control proceeds to S120, otherwise (NO at S110), control proceeds to S112.

At S112, ECU 8000 determines whether increase flag FU is "0" or not. When increase flag FU is "0" (YES at S112), control proceeds to S300, otherwise (NO at S112), control proceeds to S114.

At S114, ECU 8000 determines whether recovery timer TE>threshold value TE (1) is established or not. When recovery timer TE>threshold value TE (1) is established (YES at S114), control proceeds to S300, otherwise (NO at S114), control proceeds to S116.

At S116, ECU 8000 increments backup timer TB by "1". Specifically, "1" is added to the previous value of backup timer TB to provide the current value of backup timer TB.

At S118, ECU 8000 determines whether backup timer TB>threshold value TB (1) is established or not. When backup timer TB>threshold value TB (1) is established (YES at S118), control proceeds to S300, otherwise (NO at S118), control proceeds to S120.

At S120, ECU 8000 determines whether engine torque ET changing rate ΔET>threshold value ΔET (1) is established or not (determines whether the increase rate of engine torque ET is larger than a first predetermined increase rate).

When engine torque ET is increasing, engine torque ET changing rate ΔET takes a positive value. When engine torque ET is decreasing, engine torque ET changing rate ΔET takes a negative value. In the present embodiment, threshold value ΔET (1) is a positive value.

When engine torque ET changing rate ΔET>threshold value ΔET (1) is established (YES at S120), control proceeds to S400, otherwise (NO at S120), control proceeds to S122.

At S122, ECU 8000 determines whether increase flag FU is "i" or not. When increase flag FU is "1" (YES at S122), control proceeds to S124, otherwise (NO at S122), control returns to S104.

At S124, ECU 8000 determines whether engine torque ET changing rate ΔET<threshold value ΔET (2) is established or not (determines whether the increase rate of engine torque ET is smaller than a second predetermined increase rate). In the present embodiment, threshold value ΔET (2) takes a positive value.

When engine torque ET changing rate ΔET<threshold value ΔET (2) is established (YES at S124), control proceeds to S126, otherwise (NO at S124), control returns to S104.

At S126, ECU 8000 increments recovery timer TE by "1". Specifically, "1" is added to the previous value of recovery timer TE to provide the current value of recovery timer TE. Then, control returns to S106.

At S200, ECU 8000 initiates downshifting. Then, the process ends. At S300, ECU 8000 initiates upshifting. Then, the process ends. At S400, ECU 8000 sets increase flag FU to "1".

The operation of ECU 8000 qualified as the control apparatus of the present embodiment based on the configuration and flow chart set forth above will be described hereinafter, corresponding to the case where the engine torque does not increase and the case where the engine torque increases.

<When Engine Torque does not Increase>

When an upshift is requested during vehicle running (YES at S100), delay timer TD, backup timer TB and increase flag FU are initialized (S102). Further, recovery timer TE is initialized (S104). Then, delay timer TD is incremented (S106).

When a downshift is not requested (NO at S108) and delay timer TD<threshold value TD (1) is established (YES at S110), determination is made whether engine torque ET changing rate ΔET>threshold value ΔET (1) is established or not (S120).

Since the engine torque does not increase in the present example and engine torque ET changing rate ΔET≦threshold value ΔET (1) is established (NO at S120), increase flag FU is maintained at "0" (remains at the initial value). Therefore, recovery timer TE is initialized again (NO at S122, S104), and delay timer TD is incremented (S106).

Since the engine torque does not increase in the present example and engine torque ET changing rate ΔET≦threshold value ΔET (1) is established (NO at S120), gear changing is not effected and delay timer TD continues to be incremented (S106) as long as there is no downshift request (NO at S108). Increase flag FU is maintained at "0".

When delay timer TD≧threshold value TD (1) is established (NO at S110) under the state where there is no downshift request (NO at S108), upshifting is initiated (S300) since increase flag FU is "0" (YES at S112).

Thus, when the engine torque does not increase, delay is effected for a predetermined period of time with respect to the timing of upshift request determination, and then upshifting is initiated. However, when there is a downshift request during delay of an upshift (S108), a downshift is initiated by priority (S200).

<When Engine Torque Increases>

When there is an upshift request during vehicle running (YES at S100), delay timer TD, backup timer TB and increase flag FU are initialized (S102). Furthermore, recovery timer TE is initialized (S104). Then, delay timer TD is incremented (S106).

When there is no downshift request (NO at S108) and delay timer TD<threshold value TD (1) is established (YES at S110), determination is made whether engine torque ET changing rate ΔET>threshold value ΔET (1) is established or not (S120).

Since the engine torque increases in the present example and engine torque ET changing rate ΔET>threshold value ΔET (1) is established (YES at S120), increase flag FU is set at "1" (S400). Then, recovery timer TE is initialized again (S104), and delay timer TD is incremented (S106).

During the establishment of engine torque ET changing rate ΔET>threshold value ΔET (1) (YES at S120), initialization of recovery timer TE (S104) and increment of delay timer TD (S106) are repeated as long as there is no downshift request (NO at S108).

Figure 6:
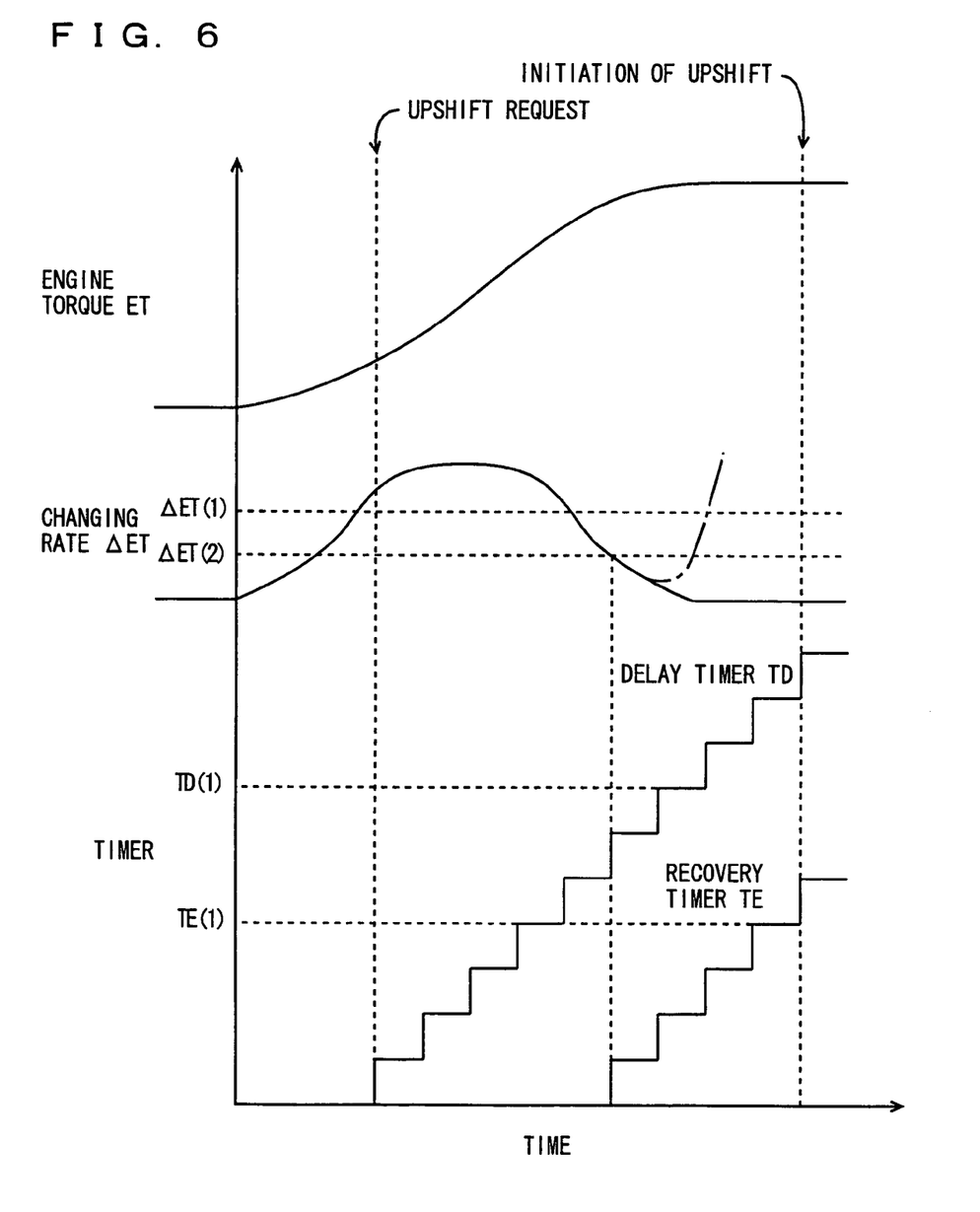
FIGS. 6 and 7 are first and second timing charts, respectively, representing the transition of engine torque ET and a changing rate ΔET.

Referring to FIG. 6, when engine torque ET changing rate ΔET decreases and engine torque ET changing rate ΔET≦threshold value ΔET (1) (NO at S120), determination is made whether engine torque ET changing rate ΔET<threshold value ΔET (2) is established or not (S124) since increase flag FU is "1" (YES at S122).

When engine torque ET changing rate ΔET≧ΔET threshold value ΔET (2) is established (NO at S124), recovery timer TE is initialized again (S104) and delay timer TD is incremented (S106), likewise the case where engine torque ET changing rate ΔET≧threshold value ΔET (1) (YES at S120).

Specifically, during establishment of engine torque ET changing rate ΔET≧threshold value ΔET (2) (NO at S124), initialization of recovery timer TE (S104) and increment of delay timer TD (S106) are repeated as long as there is no downshift request (NO at S108).

Referring to FIG. 6, when engine torque ET changing rate ΔET is further decreased and engine torque ET changing rate ΔET<threshold value ΔET (2) is established (YES at S124), recovery timer TE is incremented (S126). Then, delay timer TD is incremented again (S106).

During the establishment of engine torque ET changing rate ΔET<threshold value ΔET (2) (YES at S124), increment of recovery timer TE (S126) and increment of delay timer TD (S106) are repeated as long as there is no downshift request (NO at S108).

It is to be noted that, as shown by the chain dotted line in FIG. 6, when engine torque ET changing rate ΔET is increased again such that engine torque ET changing rate ΔET≧threshold value ΔET (2) is established (YES at S120 or NO at S124), recovery timer TE is initialized (S104).

When delay timer TD≧threshold value TD (1) (NO at S110) under the state where there is no downshift request (NO at S108), determination is made whether recovery timer TE≧threshold value TE (1) is established or not (S114) since increase flag FU is "1" (NO at S112).

As indicated by the solid line in FIG. 6, when recovery timer TE>threshold value TE (1) is established (YES at S114)

as a result of continuation of engine torque ET changing rate ΔET<threshold value ΔET (2) (YES at S124), upshifting is initiated (S300).

Thus, when the engine torque is increased, initiation of upshifting can be delayed for the duration of a predetermined time of the state of engine torque ET changing rate ΔET<threshold value ΔET (2).

Thus, the event of the output shaft torque of transmission 2000 (the torque transmitted to the wheel) being decreased by an upshift during acceleration to result in a sudden reduction in acceleration can be suppressed. Therefore, occurrence of a gear change shock can be suppressed. Further, the event of acceleration being suddenly decreased by an upshift to disallow acceleration as requested by the driver, contrary to the driver's request, can be suppressed.

Figure 7:
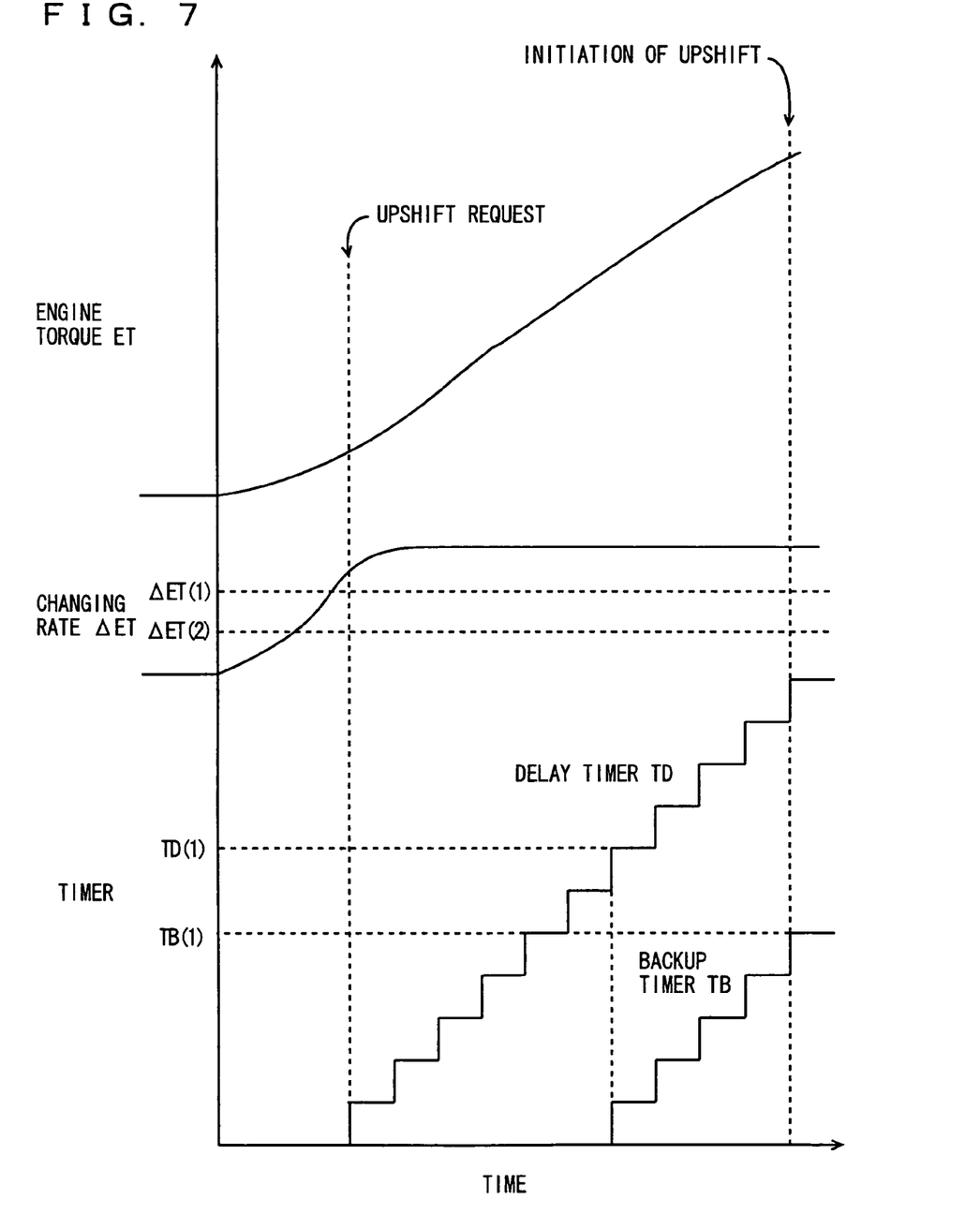

Referring to FIG. 7, when engine torque ET is continuously increasing and engine torque ET changing rate ΔET≧threshold value ΔET (2) is established (YES at S120 or NO at S124), delay timer TD is not incremented and initialization is repeated (S104).

Therefore, during establishment of engine torque ET changing rate ΔET≧threshold value ΔET (2) (YES at S120 or NO at S124), recovery timer TE≦threshold value TE (1) is established (NO at S114).

In this case, backup timer TB is incremented (S116), and determination is made whether backup timer TB>threshold value TB (1) is established or not (S118). When backup timer TB≦threshold value TB (1) (NO at S118), increment of backup timer TB is repeated (S116) as long as engine torque ET changing rate ΔET≧threshold value ΔET (2) (YES at S120 or NO at S124).

Even if engine torque ET changing rate ΔET<threshold value ΔET (2) (YES at S124), increment of backup timer TB is repeated (S116) as long as recovery timer TE≦threshold value TE (1) is established (NO at S114).

In other words, following establishment of delay timer TD≧threshold value TD (1) (NO at S110), increment of backup timer TB is repeated (S116) as long as upshifting or downshifting is not initiated.

When backup timer TB>threshold value TB (1) (YES at S118), upshifting is initiated (S300). Therefore, even if engine torque ET changing rate ΔET does not satisfy the condition to initiate upshifting, an upshift can be eventually executed at the elapse of a predetermined time. Therefore, the event of an upshift is not being effected can be suppressed.

It is to be noted that, when there is a downshift request during delay of an upshift (S108), downshifting will be initiated by priority (S200). Accordingly, the output shaft torque of transmission 2000 (the torque transmitted to the wheel) can be further boosted to increase the acceleration. The vehicle can be accelerated as requested by the driver.

In accordance with the ECU qualified as a control apparatus of the present embodiment, when engine torque ET changing rate ΔET>threshold value ΔET (1) is established and the engine torque is increasing, initiation of upshifting is delayed for the duration of a predetermined time of the state of engine torque ET changing rate ΔET<threshold value ΔET (2). Thus, the event of the output shaft torque of transmission 2000 (the torque transmitted to the wheel) being decreased by an upshift during acceleration to result in a sudden reduction in acceleration can be suppressed. Therefore, a gear change shock can be suppressed. As a result, degradation of drivability can be suppressed.

Second Embodiment

The second embodiment of the present invention differs from the first embodiment in that initiation of upshifting is delayed when engine torque ET decreases. The remaining elements are similar to those of the first embodiment. Their function are also the same. Therefore, detailed description thereof will not be repeated.

Figure 8:
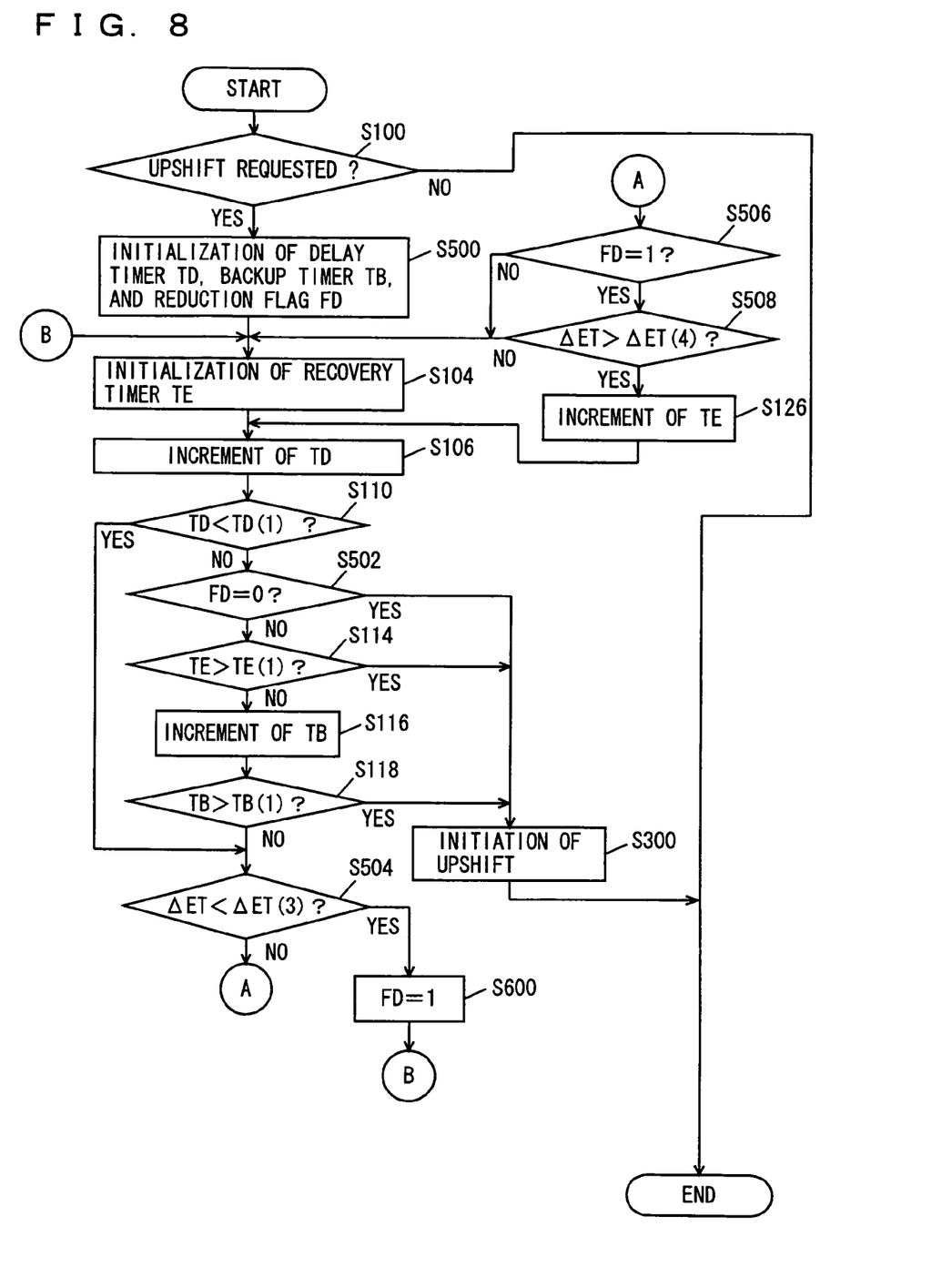
FIG. 8 is a flow chart of a control program executed by an ECU qualified as a control apparatus according to a second embodiment of the present invention.

The control program executed by ECU 8000 qualified as a control apparatus of the present embodiment will be described hereinafter with reference to FIG. 8. The program set forth below is executed in addition to or instead of the program described in the first embodiment. Steps similar to those of the first embodiment have the same reference number allotted. Therefore, detailed description thereof will not be repeated.

At S500, ECU 8000 initializes delay timer TD, backup timer TB, and reduction flag FD. Reduction flag FD is set to determine the changing tendency of engine torque (output shaft torque of engine 1000) ET. By initialization, delay timer TD, backup timer TB, and reduction flag FD are all set to "0".

At S502, ECU 8000 determines whether reduction flag FD is "0" or not. When reduction flag FD is "0" (YES at S502), control proceeds to S300, otherwise (NO at S502), control proceeds to S114.

At S504, ECU 8000 determines whether engine torque ET changing rate ΔET<threshold value ΔET (3) is established or not (determines whether the reduction rate of engine torque ET is larger than a first predetermined reduction rate). In the present embodiment, threshold value ΔET (3) is a negative value.

When engine torque ET changing rate ΔET<threshold value ΔET (3) (YES at S504), control proceeds to S600, otherwise (NO at S504), control proceeds to S506.

At S506, ECU 8000 determines whether reduction flag FD is "1" or not. When reduction flag FD is "1" (YES at S506), control proceeds to S508, otherwise (NO at S506), control returns to S104.

At S508, ECU 8000 determines whether engine torque ET changing rate ΔET>threshold value ΔET (4) is established or not (determines whether engine torque ET changing rate ΔET is smaller than a second predetermined reduction rate). In the present embodiment, threshold value ΔET (4) is a negative value.

When engine torque ET changing rate ΔET>threshold value ΔET (4) is established (YES at S508), control proceeds to S126, otherwise (NO at S508), control returns to S104. At S600, ECU 8000 sets reduction flag FD to "1". Then, the process ends.

An operation of ECU 8000 qualified as a control apparatus of the present embodiment based on the configuration and flow chart set forth above will be described hereinafter.

When there is an upshift request during a vehicle running mode (YES at S100), delay timer TD, backup timer TB, and reduction flag FD are initialized (S500). Also, recovery timer TE is initialized (S104). Then, delay timer TD is incremented (S106). During establishment of delay timer TD<threshold value TD (1) (YES at S110), determination is made whether engine torque ET changing rate ΔET<threshold value ΔET (3) is established or not (S504).

When the engine torque is not reduced and engine torque ET changing rate ΔET≧threshold value ΔET (3) (NO at S504), delay timer TD is continuously incremented without gear change (S106), likewise the case where the engine torque is not increased in the previous first embodiment. Reduction flag FD remains at "0".

When delay timer TD≧threshold value TD (1) (NO at S110), upshifting is initiated (S300) since reduction flag FD is "0" (YES at S112).

Thus, when the engine torque is not reduced, upshifting can be initiated with a delay for a predetermined time with respect to the timing of determining an upshift request.

When the engine torque is reduced and engine torque ET changing rate ΔET<threshold value ΔET (3) (YES at S504), reduction flag FD is set at "1" (S600). Then, recovery timer TE is initialized again (S104). Delay timer TD is incremented (S106).

During establishment of engine torque ET changing rate ΔET<threshold value ΔET (3) (YES at S504), initialization of recovery timer TE (S104) and increment of delay timer TD (S106) are repeated.

Figure 9:
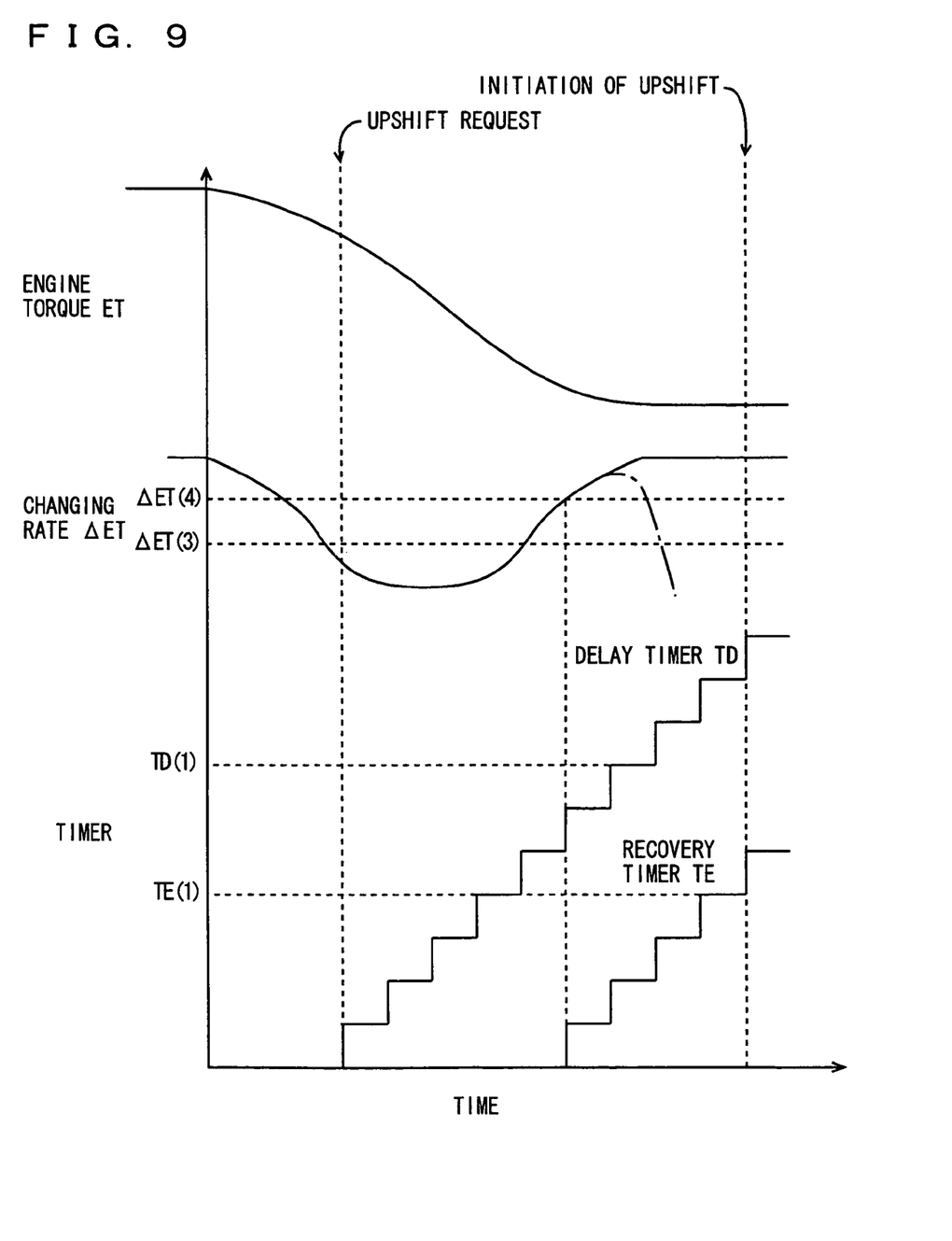
FIGS. 9 and 10 are third and fourth timing charts, respectively, representing the transition of engine torque ET and changing rate ΔET thereof.

Referring to FIG. 9, when engine torque ET changing rate ΔET increases and engine torque ET changing rate ΔET≧threshold value ΔET (3) is established (NO at S504), determination is made whether engine torque ET changing rate ΔET≧threshold value ΔET (4) is established or not (S508) since reduction flag FD is "1" (YES at S506).

When engine torque ET changing rate ΔET≦threshold value ΔET (4) is established (NO at S508), recovery timer TE is initialized again (S104), and delay timer TD is incremented (S106), likewise the case where engine torque ET changing rate ΔET≦threshold value ΔET (1) is established in the previous first embodiment.

During establishment of engine torque ET changing rate ΔET≦threshold value ΔET (4) (NO at S508), initialization of recovery timer TE (S104) and increment of delay timer TD (S106) are repeated.

Referring to FIG. 9, when engine torque ET changing rate ΔET further increases and engine torque ET changing rate ΔET>threshold value ΔET (4) is established (YES at S508), recovery timer TE is incremented (S126). Then, delay timer TD is incremented again (S106).

During establishment of engine torque ET changing rate ΔET>threshold value ΔET (4) (YES at S508), increment of recovery timer TE (S126) and increment of delay timer TD (S106) are repeated.

As indicated by the chain dotted line in FIG. 9, when engine torque ET changing rate ΔET is reduced again and engine torque ET changing rate ΔET≦threshold value ΔET (4) is established (YES at S504 or NO at S508), recovery timer TE is initialized (S104).

When delay timer TD≧threshold value TD (1) is established (NO at S110), determination is made whether recovery timer TE>threshold value TE (1) is established or not (S114) since reduction flag FD is "1" (NO at S502).

As indicated by the solid line in FIG. 9, when the state of engine torque ET changing rate ΔET>threshold value ΔET (4) (YES at S508) continues, and recovery timer TE>threshold value TE (1) is established (YES at S114), upshifting is initiated (S300).

Thus, when engine torque ET is reduced, initiation of upshifting can be delayed for the duration of a predetermined time of the state of engine torque ET changing rate ΔET<threshold value ΔET (4).

Figure 10:
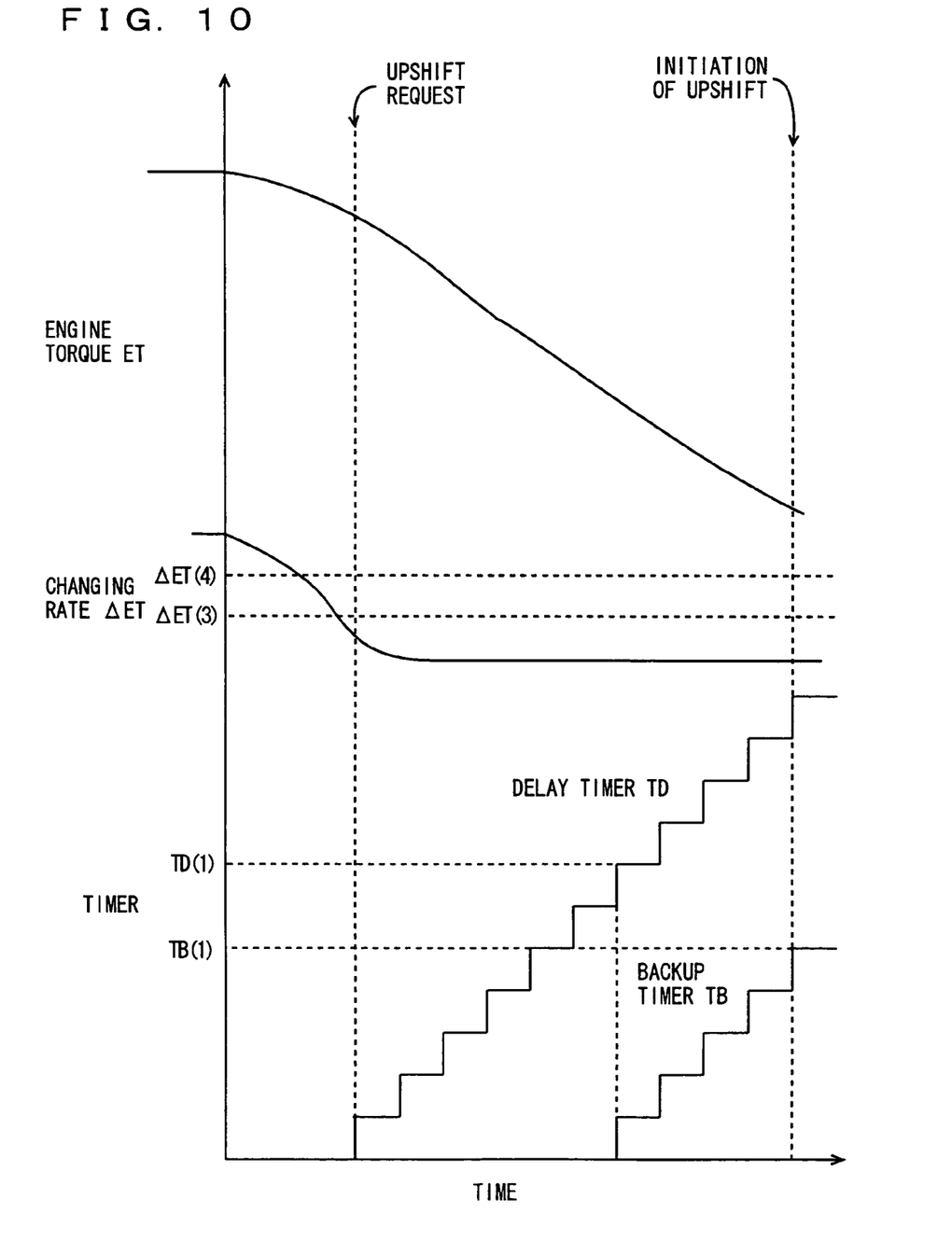

Therefore, the event of conducting an upshift under the state where engine torque ET is unstable and it is difficult to adjust the engagement pressure of the clutch and brake so as to follow the change in the torque input to transmission 2000 can be suppressed. As a result, a gear change shock can be suppressed As shown in FIG. 10, when engine torque ET continues to be decreased and engine torque ET changing rate ΔET≦threshold value ΔET (4) is established (YES at S504 or NO at S508), initialization is repeated (S104) without delay timer TD being incremented.

Therefore, during establishment of engine torque ET changing rate ΔET≦threshold value ΔET (4) (YES at S504 or NO at S508), recovery timer TE≦threshold value TE (1) is established (NO at S114).

In this case, backup timer TB is incremented (S116), and determination is made whether backup timer TB>threshold value TB (1) is established (S118). When backup timer TB≦threshold value TB (1) is established (NO at S118), increment of backup timer TB is repeated (S116) as long as engine torque ET changing rate ΔET≦threshold value ΔET (4) is established (YES at S504 or NO at S508).

Even if engine torque ET changing rate ΔET>threshold value ΔET (4) is established (YES at S508), increment of backup timer TB is repeated (S116) as long as recovery timer TE≦threshold value TE (1) (NO at S114).

In other words, following establishment of delay timer TD≧threshold value TD (1) (NO at S110), increment of backup timer TB is repeated (S116) as long as upshifting or downshifting is not initiated.

When backup timer TB>threshold value TB (1) is established (YES at S118), upshifting is initiated (S300). Therefore, even if engine torque ET changing rate ΔET does not satisfy the condition to initiate upshifting, an upshift can be eventually executed at elapse of a predetermined time. Therefore, the event of an upshift not being effected can be suppressed.

In accordance with the ECU qualified as a control apparatus of the second embodiment, when engine torque ET changing rate ΔET<threshold value ΔET (3) and the engine torque is being reduced, initiation of upshifting is delayed for the duration of a predetermined time of the state of engine torque ET changing rate ΔET>threshold value ΔET (4). Therefore, an upshift can be conducted under the state in which engine torque ET is stable. As a result, the event of a gear change shock that may occur by effecting an upshift under the state where the torque applied to the transmission is unstable can be suppressed. As a result, degradation in drivability can be suppressed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus for an automatic transmission coupled to a motive power source, comprising:
a sensing unit sensing an output shaft torque of said motive power source, and
a control unit controlling said automatic transmission such that, when a changing rate of said output shaft torque satisfies a first predetermined condition, initiation of an upshift is delayed until a second predetermined condition is satisfied;
wherein said first predetermined condition includes a condition that an increase rate of said output shaft torque is larger than a first predetermined increase rate, and
wherein said second predetermined condition includes a condition that the increase rate of said output shaft torque is smaller than a second predetermined increase rate.

2. The control apparatus for an automatic transmission according to claim 1, further comprising a downshift control unit controlling said automatic transmission such that, when a downshift is requested prior to initiation of an upshift by delay of initiation of an upshift, a downshift is effected by priority instead of an upshift.

3. A control apparatus for an automatic transmission coupled to a motive power source, comprising:

a sensing unit sensing an output shaft torque of said motive power source, and a control unit controlling said automatic transmission such that, when a changing rate of said output shaft torque satisfies a first predetermined condition, initiation of an upshift is delayed until a second predetermined condition is satisfied;

wherein said first predetermined condition includes a condition that a reduction rate of said output shaft torque is larger than a first predetermined reduction rate, and wherein said second predetermined condition includes a condition that the reduction rate of said output shaft torque is smaller than a second predetermined reduction rate.

4. A control apparatus for an automatic transmission coupled to a driver source, comprising:

sensing means for sensing an output shaft torque of said motive power source, and control means for controlling said automatic transmission such that, when a changing rate of said output shaft torque satisfies a first predetermined condition, initiation of an upshift is delayed until a second predetermined condition is satisfied;

wherein said first predetermined condition includes a condition that an increase rate of said output shaft is larger than a first predetermined increase rate, and wherein said second predetermined condition includes a condition that the increase rate of said output shaft torque is smaller than a second predetermined increase rate.

5. The control apparatus for an automatic transmission according to claim 4, further comprising means for controlling said automatic transmission such that, when a downshift is requested prior to initiation of an upshift by delay of initiation of an upshift, a downshift is effected by priority instead of an upshift.

6. A control apparatus for an automatic transmission coupled to a driver source, comprising:

sensing means for sensing an output shaft torque of said motive power source, and control means for controlling said automatic transmission such that, when a changing rate of said output shaft torque satisfies a first predetermined condition, initiation of an upshift is delayed until a second predetermined condition is satisfied;

wherein said first predetermined condition includes a condition that a reduction rate of said output shaft torque is larger than a first predetermined reduction rate, and wherein said second predetermined condition includes a condition that the reduction rate of said output shaft torque is smaller than a second predetermined reduction rate.

* * * * *